No. 812,903. PATENTED FEB. 20, 1906.
B. TROPP.
GEARING.
APPLICATION FILED SEPT. 17, 1904.

Fig 1

Fig 2

Witnesses
O. Otto
W. H. Cook

Inventor
Bernhard Tropp
By his Attorney

UNITED STATES PATENT OFFICE.

BERNHARD TROPP, OF NEW YORK, N. Y., ASSIGNOR TO WILLIAM HENRY LAIRD, OF NEW YORK, N. Y.

GEARING.

No. 812,903.  Specification of Letters Patent.  Patented Feb. 20, 1906.

Application filed September 17, 1904. Serial No. 224,852.

*To all whom it may concern:*

Be it known that I, BERNHARD TROPP, a citizen of the United States, and a resident of the borough of Manhattan, in the county of New York and State of New York, have invented certain new and useful Gearing, of which the following is a specification.

This invention relates to gearing; and its object is the production of a reversing-gear.

In the drawings, Figure 1 represents a front elevation and partial axial section of the invention. Fig. 2 shows a partial section of Fig. 1 on the line x x and end view of said Fig. 1.

A frame 1 carries the bearings 2 and 3 for the shaft 4, on which latter are supported the bevel-pinions 5 and 6, each of which mesh with the bevel-wheel 7 on the shaft 33. The said pinions bear against the bearings on the frame 1 and are separated by the sleeve 8 on the shaft 4. The said sleeve has slots 9 and 10 for the pins 11 and 12, that are fastened to and pass through the shaft 4. Horizontal pins 13 and 14 extend from the pinions 5 and 6, respectively, to engage the pins 11 and 12.

In the end of the shaft 4 there is a slot 15 for a feather 16, that extends from a spur-gear 17 on the shaft 4. The gear 17 meshes with a pinion 18, carried on a shaft 19, that is connected with a source of power.

A lug 20 extends from the frame 1 and is threaded for a screw 21 with a jam-nut 22 to keep the gear 17 in proper position.

One end of the shaft 4 carries a locking device comprising a lever 23, that is carried on a pin 24 and can engage the shaft 4 in grooves like 25. The said lever has the stop 26, which can abut against the face of the rib 27 of the frame 1, and it has the hook 28, which is connected with a spring 29 to the frame 1.

From the bearing 2 extends the lug 30, and a lock 31 joins the said lug and lever 23. A hand-wheel 32 is carried on the shaft 4.

Having described my invention, I claim—

In a reversing-gear the combination of a frame, a vertical and a pair of horizontal bearings extending from the frame, a main shaft located in the vertical bearing, a bevel-gear fastened to the main shaft, a second shaft supported in the horizontal bearings and having a pair of grooves, a pair of bevel-pinions supported on the second shaft, a sleeve on the second shaft separating the bevel-pinions, pins extending from the second shaft, pins extending from the bevel-pinions, the second shaft arranged to slide in its bearings so that one of the pins thereon may be engaged with a pin of the bevel-pinions in one position thereof, and the other pin of the second shaft arranged to be engaged with the pin of the other bevel-pinion after the second shaft has been moved to another position, a lever having a hook extending therefrom fulcrumed on the frame and arranged to engage one of the two grooves on the second shaft, a spring between the hook of the lever and the frame to hold the lever in engagement with one of the grooves on the second shaft, a lug extending from the frame, and means to lock the said lever with said lug.

Signed at New York, in the county of New York and State of New York, this 13th day of September, A. D. 1904.

BERNHARD TROPP. [L. S.]

Witnesses:
 AUGUST JOHNSTON,
 W. H. LAIRD.